(12) United States Patent
Matsumoto

(10) Patent No.: US 12,724,161 B2
(45) Date of Patent: Sep. 1, 2026

(54) INUNDATION DEPTH PREDICTION DEVICE, AND INUNDATION DEPTH PREDICTION METHOD

(71) Applicant: Mitsubishi Electric Corporation, Tokyo (JP)

(72) Inventor: Takashi Matsumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 496 days.

(21) Appl. No.: 18/213,037

(22) Filed: Jun. 22, 2023

(65) Prior Publication Data

US 2023/0333270 A1 Oct. 19, 2023

Related U.S. Application Data

(63) Continuation of application No. PCT/JP2021/003135, filed on Jan. 29, 2021.

(51) Int. Cl.
*G01V 1/01* (2024.01)
*G01C 13/00* (2006.01)

(52) U.S. Cl.
CPC ............ *G01V 1/01* (2024.01); *G01C 13/006* (2013.01)

(58) Field of Classification Search
CPC ................................ G01V 1/01; G01C 13/006
See application file for complete search history.

(56) References Cited

U.S. PATENT DOCUMENTS 10,664,937 B2 * 5/2020 Wani .................... G06Q 50/265
2019/0179011 A1 6/2019 Yamada et al.
2019/0212470 A1 7/2019 Koyanagi et al.
2020/0348132 A1 * 11/2020 Du .......................... G01C 5/00

FOREIGN PATENT DOCUMENTS

JP 2005-208001 A 8/2005
JP 6161130 B2 7/2017
JP 6370525 B1 8/2018
JP 2020-173160 A 10/2020
WO WO 2018-037533 A1 3/2018

OTHER PUBLICATIONS

German Office Action for German Application No. 11 2021 006 190.9, dated Oct. 21, 2025, with English translation.
International Search Report (PCT/ISA/210) issued in PCT/JP2021/003135 mailed on Mar. 23, 2021.

* cited by examiner

*Primary Examiner* — Elias Desta
(74) *Attorney, Agent, or Firm* — Birch, Stewart, Kolasch & Birch, LLP

(57) ABSTRACT

An inundation depth prediction device includes: a flow speed value acquiring unit that acquires a flow speed value on the sea surface; and an inundation depth predicting unit that predicts an inundation depth on the ground by inputting the flow speed value acquired by the flow speed value acquiring unit to a learned inundation depth prediction model used for predicting the inundation depth on the ground from the flow speed value on the sea surface.

7 Claims, 7 Drawing Sheets

INUNDATION DEPTH PREDICTION DEVICE, AND INUNDATION DEPTH PREDICTION METHOD

CROSS REFERENCE TO RELATED APPLICATIONS

This application is a Continuation of PCT International Application No. PCT/JP2021/003135, filed on Jan. 29, 2021, which is hereby expressly incorporated by reference into the present application.

TECHNICAL FIELD

The present disclosure relates to an inundation depth prediction device and an inundation depth prediction method.

BACKGROUND ART

In a technique for predicting tsunami, tsunami is predicted on the basis of an observation value observed at the time of occurrence of an earthquake.

For example, Patent Literature 1 describes a tsunami prediction method for predicting tsunami at a prediction target position. In the tsunami prediction method, a tsunami prediction database including a tsunami wave source condition such as a wave height and tsunami prediction corresponding to the wave source condition is created, and tsunami at a prediction target position is predicted on the basis of the created tsunami prediction database.

CITATION LIST

Patent Literature

Patent Literature 1: JP 2005-208001 A

SUMMARY OF INVENTION

Technical Problem

In the tsunami prediction method as described above, for example, an observed flow speed value on the sea surface is converted into a wave height, and an inundation depth on the ground is predicted as a prediction value regarding tsunami on the basis of the converted wave height. However, such a tsunami prediction method has a problem that a prediction value includes an error in each of two stages of the conversion from the flow speed value to the wave height and the prediction of the inundation depth.

The present disclosure has been made in order to solve the above-described problem, and an object of the present disclosure is to provide a technique for improving accuracy of tsunami prediction based on a flow speed value on the sea surface.

Solution to Problem

An inundation depth prediction device according to the present disclosure includes: flow speed value acquiring circuitry that acquires a flow speed value on the sea surface; and inundation depth predicting circuitry that predicts an inundation depth on the ground by inputting the flow speed value acquired by the flow speed value acquiring circuitry to a learned inundation depth prediction model used for predicting the inundation depth on the ground from the flow speed value on the sea surface, wherein the inundation depth predicting circuitry predicts a primary prediction value of the inundation depth by inputting the flow speed value acquired by the flow speed value acquiring circuitry to the learned inundation depth prediction model, and calculates a secondary prediction value of the inundation depth on a basis of the predicted primary prediction value and a past prediction value of the inundation depth predicted in a past.

An inundation depth prediction device according to the present disclosure includes: flow speed value acquiring circuitry to acquire a flow speed value on a sea surface; and inundation depth predicting circuitry to predict an inundation depth on a ground by inputting the flow speed value acquired by the flow speed value acquiring circuitry to a learned inundation depth prediction model used for predicting the inundation depth on the ground from the flow speed value on the sea surface, wherein the flow speed value acquired by the flow speed value acquiring circuitry is time-series data indicating a flow speed value for each time, the learned inundation depth prediction model used by the inundation depth predicting circuitry is a convolutional neural network model, and the inundation depth predicting circuitry determines whether or not the time-series data acquired by the flow speed value acquiring circuitry includes a required amount of data for predicting the inundation depth using the learned inundation depth prediction model, and in a case where the inundation depth predicting circuitry determines that the time-series data does not include the required amount of data, the inundation depth predicting circuitry performs complementation of a shortage amount of data on the time-series data acquired by the flow speed value acquiring circuitry.

An inundation depth prediction device according to the present disclosure includes: flow speed value acquiring circuitry to acquire a flow speed value on a sea surface; and inundation depth predicting circuitry to predict an inundation depth on a ground by inputting the flow speed value acquired by the flow speed value acquiring circuitry to a learned inundation depth prediction model used for predicting the inundation depth on the ground from the flow speed value on the sea surface, wherein the inundation depth predicting circuitry predicts a probability distribution indicating an occurrence probability for each inundation depth by inputting the flow speed value acquired by the flow speed value acquiring circuitry to the learned inundation depth prediction model.

Advantageous Effects of Invention

According to the present disclosure, accuracy of tsunami prediction based on a flow speed value on the sea surface can be improved.

DESCRIPTION OF EMBODIMENTS

Hereinafter, in order to describe the present disclosure in more detail, an embodiment for embodying the present disclosure will be described with reference to the attached drawings.

First Embodiment

Figure 1:
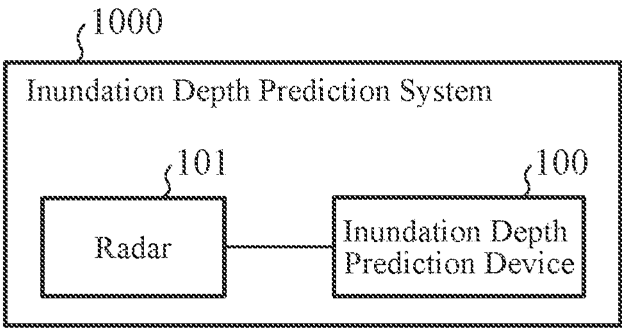
FIG. 1 is a block diagram illustrating a configuration of an inundation depth prediction system according to a first embodiment.
Figure 2:
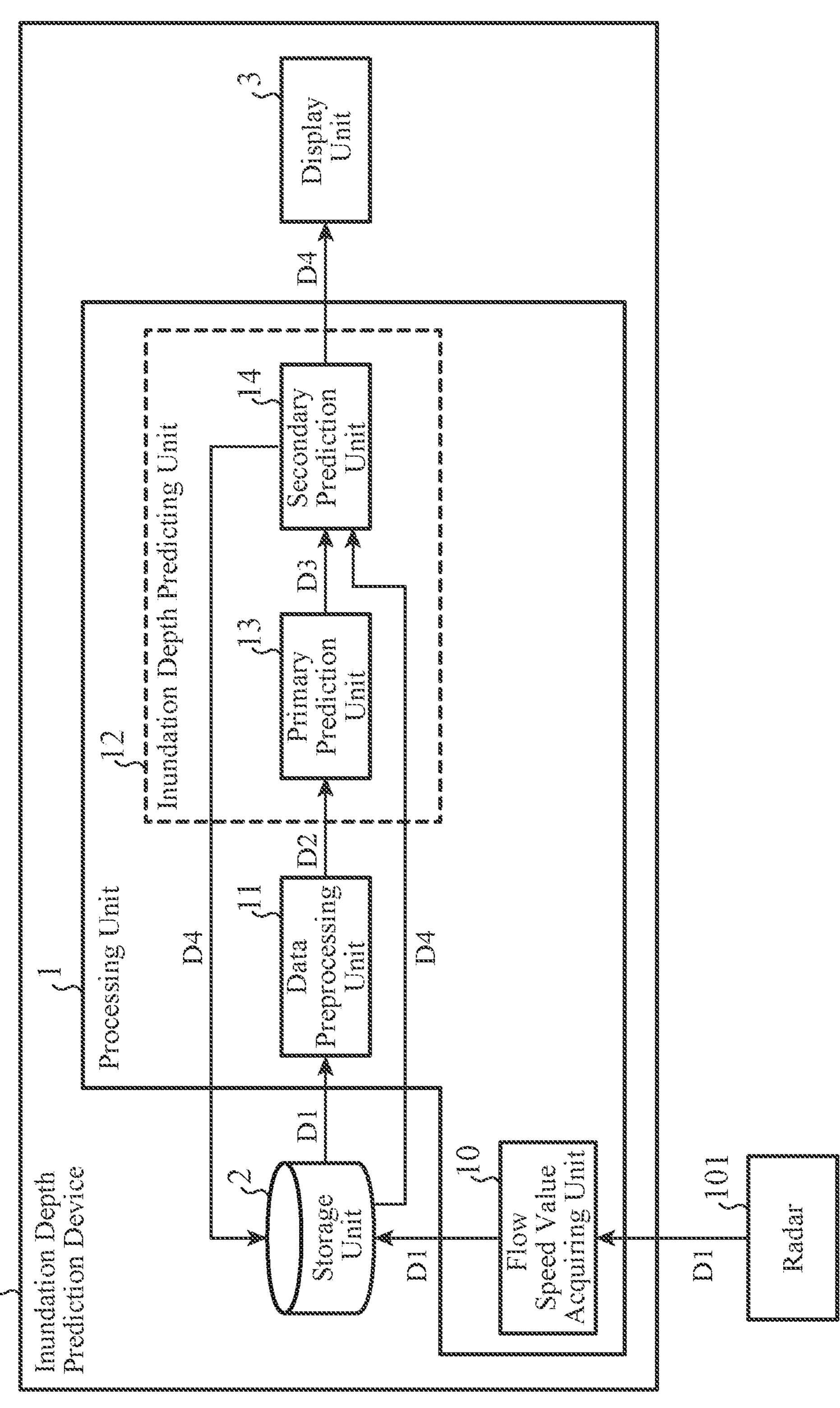
FIG. 2 is a block diagram illustrating a configuration of an inundation depth prediction device according to the first embodiment.

FIG. 1 is a block diagram illustrating a configuration of an inundation depth prediction system 1000 according to a first embodiment. FIG. 2 is a block diagram illustrating a configuration of an inundation depth prediction device 100 according to the first embodiment. As illustrated in FIG. 1, the inundation depth prediction system 1000 includes the inundation depth prediction device 100 and a radar 101. Note that the configuration illustrated in FIG. 1 is an example, and each number of devices or the like is not limited to that in this example. As illustrated in FIG. 2, the inundation depth prediction device 100 includes a processing unit 1, a storage unit 2, and a display unit 3. The processing unit 1 includes a flow speed value acquiring unit 10, a data preprocessing unit 11, and an inundation depth predicting unit 12.

The radar 101 measures a flow speed value on the sea surface. Although not illustrated, the radar 101 includes a communication interface, and transmits the measured flow speed value to the inundation depth prediction device 100 through the communication interface.

More specifically, in the first embodiment, the radar 101 divides the sea surface into any number of regions, and measures a flow speed value for each of the regions on the sea surface. Hereinafter, the flow speed value for each of the regions on the sea surface is simply referred to as a flow speed value on the sea surface.

More specifically, in the first embodiment, the radar 101 acquires time-series data indicating a flow speed value for each time by measuring the flow speed value with a lapse of time.

Although not illustrated, the inundation depth prediction device 100 includes a communication interface for receiving the flow speed value measured by the radar 101. The inundation depth prediction device 100 outputs an inundation depth generated by tsunami on the ground as a prediction value by inputting a received flow speed value to a machine learning model. For example, the inundation depth predicted by the inundation depth prediction device 100 is an inundation depth at a prediction point on the ground or an inundation depth in a prediction area on the ground.

The flow speed value acquiring unit 10 of the processing unit 1 in the inundation depth prediction device 100 acquires a flow speed value D1 on the sea surface. The flow speed value acquiring unit 10 outputs the acquired flow speed value D1 to the storage unit 2.

More specifically, in the first embodiment, the flow speed value acquiring unit 10 acquires the flow speed value D1 measured by the radar 101. More specifically, in the first embodiment, the flow speed value acquiring unit 10 acquires time-series data indicating the flow speed value D1 for each time as the flow speed value D1.

The storage unit 2 of the inundation depth prediction device 100 stores the flow speed value D1 acquired by the flow speed value acquiring unit 10. The storage unit 2 outputs the stored flow speed value D1 to the data preprocessing unit 11. More specifically, in the first embodiment, the storage unit 2 stores the time-series data acquired by the flow speed value acquiring unit 10.

The data preprocessing unit 11 of the processing unit 1 performs preprocessing on the flow speed value D1 acquired by the flow speed value acquiring unit 10. More specifically, in the first embodiment, the data preprocessing unit 11 of the processing unit 1 performs preprocessing which is at least one of standardization and complementation of missing data on the flow speed value D1 acquired by the flow speed value acquiring unit 10. The data preprocessing unit 11 outputs a preprocessed flow speed value D2 to the inundation depth predicting unit 12.

More specifically, in the first embodiment, the data preprocessing unit 11 reads the flow speed value D1 from the storage unit 2, and performs preprocessing which is at least one of standardization and complementation of missing data on the read flow speed value D1. More specifically, in the first embodiment, the data preprocessing unit 11 reads time-series data indicating the flow speed value D1 for each time from the storage unit 2, and performs preprocessing which is at least one of standardization and complementation of missing data on the read time-series data.

More specifically, for example, the data preprocessing unit 11 standardizes a flow speed value for each region on the sea surface. For example, in a case where the data preprocessing unit 11 performs complementation of missing data on the flow speed value for each region on the sea surface, the data preprocessing unit 11 performs complementation using, as a flow speed value of a region in which the flow speed value is missing, a flow speed value of a region around the region in which the flow speed value is missing. Alternatively, for example, in a case where the data preprocessing unit 11 performs complementation of missing data on the flow speed value for each region on the sea surface, the data preprocessing unit 11 performs complementation using, as a flow speed value of a region in which the flow speed value is missing, a random number generated from average or variance of all observation values of the flow speed values.

The inundation depth predicting unit 12 of the processing unit 1 predicts an inundation depth on the ground by inputting the flow speed value acquired by the flow speed value acquiring unit 10 to a learned inundation depth prediction model used for predicting the inundation depth on the ground from the flow speed value on the sea surface. In other words, the inundation depth predicting unit 12 outputs an inundation depth on the ground as a prediction value by inputting the flow speed value acquired by the flow speed value acquiring unit 10 to a learned inundation depth prediction model used for predicting the inundation depth on the ground from the flow speed value on the sea surface. The inundation depth predicting unit 12 outputs the predicted inundation depth to the display unit 3.

More specifically, in the first embodiment, the storage unit 2 stores a learned inundation depth prediction model used for predicting an inundation depth on the ground from the flow speed value on the sea surface. The inundation depth predicting unit 12 predicts an inundation depth on the ground by reading the learned inundation depth prediction model from the storage unit 2 and inputting the flow speed value acquired by the flow speed value acquiring unit 10 to the learned inundation depth prediction model that has been read.

For example, the inundation depth predicting unit 12 may predict a probability distribution indicating an occurrence probability for each inundation depth by inputting the flow speed value acquired by the flow speed value acquiring unit 10 to the learned inundation depth prediction model. That is, in this case, the learned inundation depth prediction model is a machine learning model that predicts a probability distribution indicating an occurrence probability for each inundation depth from the flow speed value on the sea surface. Alternatively, the inundation depth predicting unit 12 may predict a value uniquely indicating an inundation depth by inputting the flow speed value acquired by the flow speed value acquiring unit 10 to the learned inundation depth prediction model. That is, in this case, the learned inundation depth prediction model is a machine learning model that predicts a value uniquely indicating an inundation depth from the flow speed value on the sea surface.

More specifically, in the first embodiment, the inundation depth predicting unit 12 predicts the inundation depth on the ground by inputting the flow speed value D2 preprocessed by the data preprocessing unit 11 to the learned inundation depth prediction model.

More specifically, in the first embodiment, the inundation depth predicting unit 12 predicts the inundation depth on the ground by inputting the time-series data preprocessed by the data preprocessing unit 11 to the learned inundation depth prediction model.

More specifically, the inundation depth predicting unit 12 determines whether or not the time-series data preprocessed by the data preprocessing unit 11 includes a required amount of data for predicting the inundation depth using the learned inundation depth prediction model. Then, in a case where the inundation depth predicting unit 12 determines that the time-series data does not include the required amount of data, the inundation depth predicting unit 12 performs complementation of a shortage amount of data on the time-series data preprocessed by the data preprocessing unit 11.

More specifically, in the first embodiment, the inundation depth predicting unit 12 includes a primary prediction unit 13 and a secondary prediction unit 14.

The primary prediction unit 13 of the inundation depth predicting unit 12 predicts a primary prediction value of the inundation depth by inputting the flow speed value acquired by the flow speed value acquiring unit 10 to the learned inundation depth prediction model. The primary prediction unit 13 outputs the predicted primary prediction value to the secondary prediction unit 14.

More specifically, in the first embodiment, the primary prediction unit 13 predicts a primary prediction value D3 of the inundation depth by inputting the flow speed value D2 preprocessed by the data preprocessing unit 11 to the learned inundation depth prediction model.

More specifically, the primary prediction unit 13 predicts the primary prediction value D3 of the inundation depth by inputting the time-series data preprocessed by the data preprocessing unit 11 to the learned inundation depth prediction model.

Figure 3:
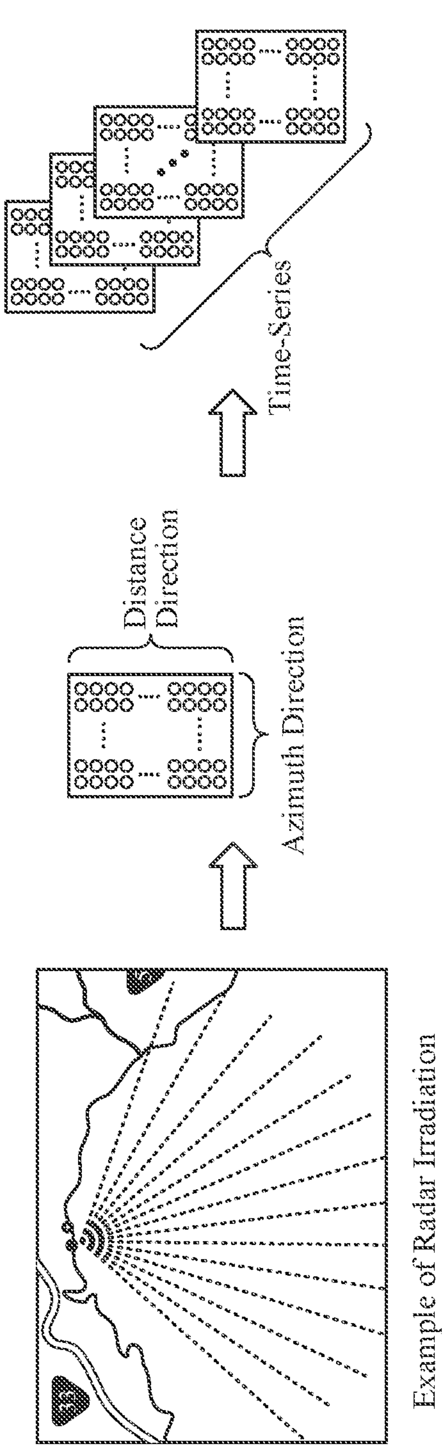
FIG. 3 is a diagram for explaining time-series data indicating a flow speed value for each time according to a specific example of the first embodiment.

FIG. 3 is a diagram for explaining time-series data indicating a flow speed value for each time according to a specific example of the first embodiment. As illustrated in the left diagram in FIG. 3, the radar 101 measures a flow speed value for each region on the sea surface by transmitting a radio wave from the ground toward the sea surface and receiving a reflected wave thereof. Then, the radar 101 acquires time-series data indicating a flow speed value for each time by measuring the flow speed value with a lapse of time.

As illustrated in the middle diagram in FIG. 3, in the specific example, the primary prediction unit 13 inputs a flow speed value for each time indicated by the time-series data acquired from the data preprocessing unit 11 to a convolutional neural network model as the learned inundation depth prediction model in an input format of a convolutional neural network (CNN) in which an azimuth direction of an observation point by the radar 101 is set to a width and a distance direction of the observation point by the radar 101 is set to a height. That is, the primary prediction unit 13 treats the flow speed values as image data by arranging the flow speed values at positions corresponding to irradiation points (azimuth direction and distance direction) of the radar 101.

In addition, as illustrated in the right diagram in FIG. 3, in the specific example, the primary prediction unit 13 inputs the time-series data acquired from the data preprocessing unit 11 to the convolutional neural network model as the learned inundation depth prediction model in an input format of a convolutional neural network (CNN) in which observation time by the radar 101 is set to a channel direction. That is, the primary prediction unit 13 time-sequentially inputs each flow speed value from the past to the present to the convolutional neural network.

For example, the primary prediction unit 13 may uniquely predict a primary prediction value of the inundation depth by solving the learned inundation depth prediction model to which the flow speed value has been input as a normal regression problem. Alternatively, for example, the primary prediction unit 13 may predict a probability distribution indicating an occurrence probability for each inundation depth by using a mixed density network or the like as the learned inundation depth prediction model.

The secondary prediction unit 14 calculates a secondary prediction value D4 of the inundation depth on the basis of the primary prediction value D3 predicted by the primary prediction unit 13 and a past prediction value of the inundation depth predicted in the past. The secondary prediction unit 14 outputs the calculated secondary prediction value D4 to the display unit 3 and the storage unit 2. The storage unit 2 stores the secondary prediction value D4 calculated by the secondary prediction unit 14.

More specifically, in the first embodiment, the storage unit 2 stores the secondary prediction value D4 calculated in the past by the secondary prediction unit 14. The secondary prediction unit 14 reads the secondary prediction value D4 as the past prediction value from the storage unit 2, and calculates the secondary prediction value D4 of the inundation depth for display on the basis of the secondary prediction value D4 as the read past prediction value and the primary prediction value D3 predicted by the primary prediction unit 13. More specifically, in the first embodiment, the secondary prediction unit 14 calculates the secondary prediction value D4 of the inundation depth for display by correcting the primary prediction value D3 predicted by the primary prediction unit 13 using the secondary prediction value D4 as the read past prediction value.

For example, the secondary prediction unit 14 takes a measure against an outlier depending on an observation environment, such as an abnormal value caused by the radar 101, using both the primary prediction value predicted by the primary prediction unit 13 and the secondary prediction value as the past prediction value read from the storage unit 2. More specifically, for example, the secondary prediction unit 14 calculates the secondary prediction value D4 for display from which an influence of an outlier has been removed by calculating a median of the primary prediction value and the past prediction value as the secondary prediction value of the inundation depth for display.

The display unit 3 displays the inundation depth predicted by the inundation depth predicting unit 12. More specifically, in the first embodiment, the display unit 3 displays the secondary prediction value D4 calculated by the secondary prediction unit 14. For example, in a case where the inundation depth predicting unit 12 predicts a probability distribution indicating an occurrence probability for each inundation depth, the display unit 3 displays a waveform of the probability distribution.

Figure 4:
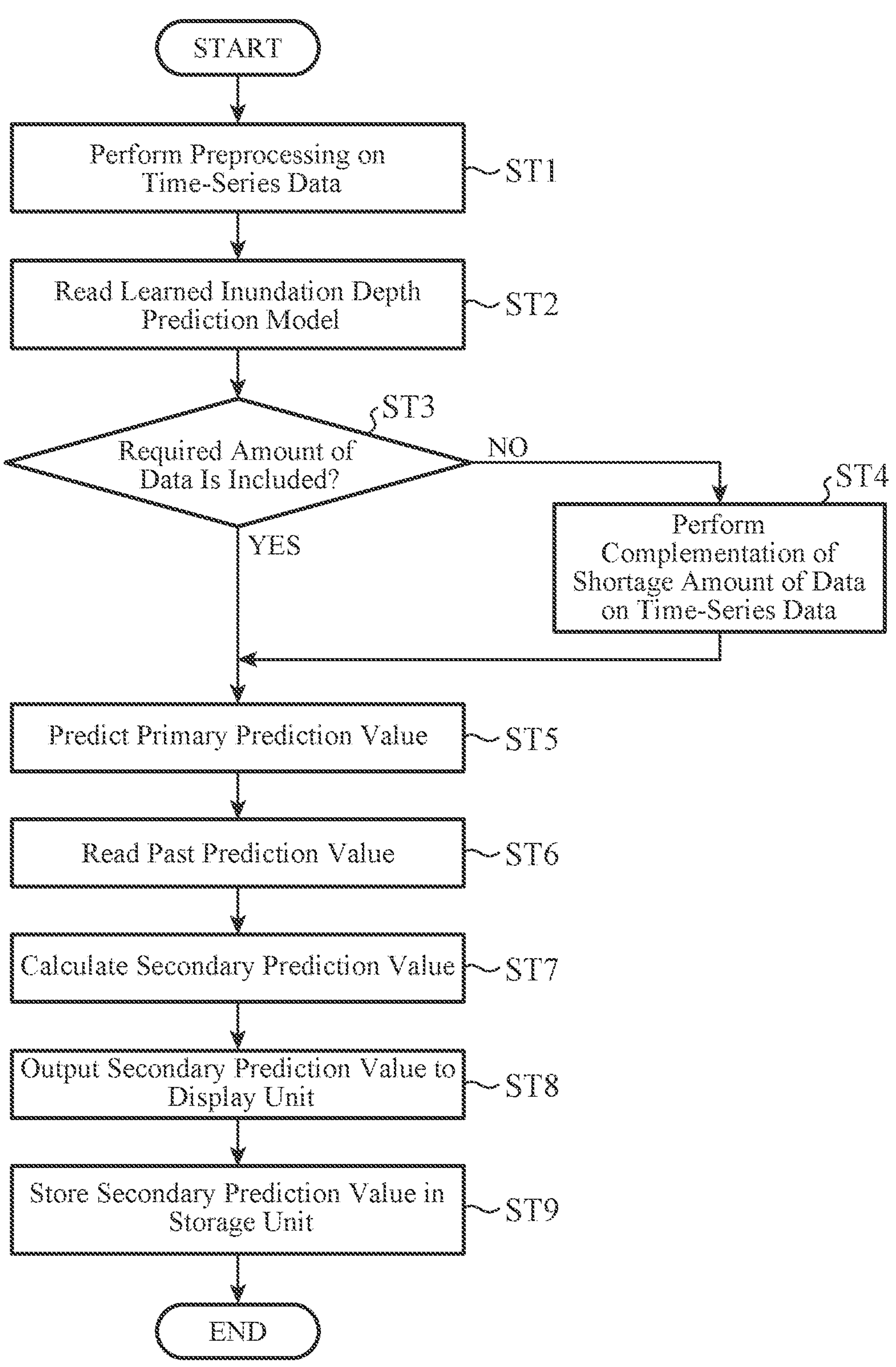
FIG. 4 is a flowchart illustrating an inundation depth prediction method performed by a processing unit of the inundation depth prediction device according to the first embodiment.

Hereinafter, an operation of the inundation depth prediction device 100 according to the first embodiment will be described with reference to the drawings. FIG. 4 is a flowchart illustrating an inundation depth prediction method performed by the processing unit 1 of the inundation depth prediction device 100 according to the first embodiment. Note that it is assumed that, before steps described below, the radar 101 acquires time-series data indicating a flow speed value for each time, and the flow speed value acquiring unit 10 acquires the time-series data acquired by the radar 101 and stores the time-series data in the storage unit 2.

As illustrated in FIG. 4, the data preprocessing unit 11 reads time-series data indicating a flow speed value for each time from the storage unit 2, and performs preprocessing which is at least one of standardization and complementation of missing data on the read time-series data (step ST1). The data preprocessing unit 11 outputs the preprocessed time-series data to the inundation depth predicting unit 12.

Next, the inundation depth predicting unit 12 reads the learned inundation depth prediction model from the storage unit 2 (step ST2).

Next, the inundation depth predicting unit 12 determines whether or not the time-series data preprocessed by the data preprocessing unit 11 includes a required amount of data for predicting the inundation depth using the learned inundation depth prediction model (step ST3).

If the inundation depth predicting unit 12 determines that the time-series data does not include the required amount of data (NO in step ST3), the inundation depth predicting unit 12 proceeds to step ST4, and if the inundation depth predicting unit 12 determines that the time-series data includes the required amount of data (YES in step ST3), the inundation depth predicting unit 12 proceeds to step ST5.

In step ST4, the inundation depth predicting unit 12 performs complementation of a shortage amount of data on the time-series data preprocessed by the data preprocessing unit 11. Next, the inundation depth predicting unit 12 proceeds to step ST5.

In step ST5, the primary prediction unit 13 of the inundation depth predicting unit 12 predicts a primary prediction value of the inundation depth by inputting the time-series data preprocessed by the data preprocessing unit 11 to the learned inundation depth prediction model. The primary prediction unit 13 outputs the predicted primary prediction value to the secondary prediction unit 14.

Next, the secondary prediction unit 14 of the inundation depth predicting unit 12 reads the secondary prediction value D4 as the past prediction value from the storage unit 2 (step ST6).

Next, the secondary prediction unit 14 calculates a secondary prediction value of the inundation depth for display by correcting the primary prediction value predicted by the primary prediction unit 13 using the secondary prediction value as the read past prediction value (step ST7).

Next, the secondary prediction unit 14 outputs the calculated secondary prediction value to the display unit 3 (step ST8). The display unit 3 displays the secondary prediction value calculated by the secondary prediction unit 14.

Next, the secondary prediction unit 14 stores the calculated secondary prediction value in the storage unit 2 (step ST9).

Figure 5:
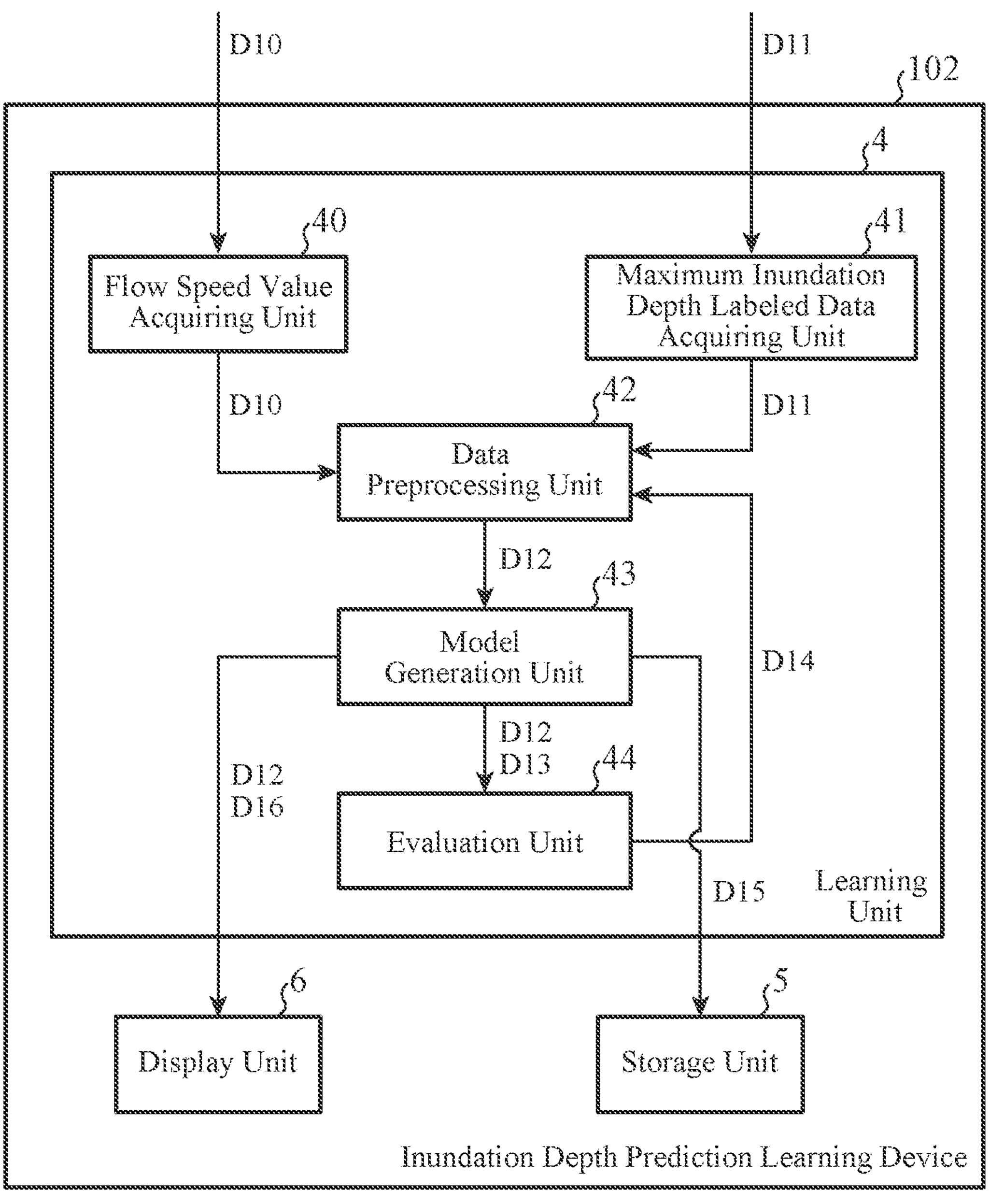
FIG. 5 is a block diagram illustrating a configuration of an inundation depth prediction learning device according to the first embodiment.

Hereinafter, a configuration of an inundation depth prediction learning device 102 according to the first embodiment will be described with reference to the drawings. FIG. 5 is a block diagram illustrating a configuration of the inundation depth prediction learning device 102 according to the first embodiment. As illustrated in FIG. 5, the inundation depth prediction learning device 102 includes a learning unit 4, a storage unit 5, and a display unit 6. The learning unit 4 includes a flow speed value acquiring unit 40, a maximum inundation depth labeled data acquiring unit 41, a data preprocessing unit 42, a model generation unit 43, and an evaluation unit 44. Note that, although not illustrated, it is assumed that the inundation depth prediction learning device 102 is connected to the inundation depth prediction device 100 described above. In addition, in the first embodiment, the inundation depth prediction learning device 102 will be described as a device different from the inundation depth prediction device 100 described above, but the inundation depth prediction device 100 may further include components of the inundation depth prediction learning device 102 described below.

The flow speed value acquiring unit 40 acquires a flow speed value D10 on the sea surface. The flow speed value acquiring unit 40 outputs the acquired flow speed value D10 on the sea surface to the data preprocessing unit 42.

The maximum inundation depth labeled data acquiring unit 41 acquires maximum inundation depth labeled data D11 indicating a maximum inundation depth on the ground. The maximum inundation depth labeled data acquiring unit 41 outputs the acquired maximum inundation depth labeled data D11 to the data preprocessing unit 42.

For example, the flow speed value acquired by the flow speed value acquiring unit 40 and the maximum inundation depth labeled data acquired by the maximum inundation depth labeled data acquiring unit 41 are each data created by simulation. Simulation data created by the simulation is, for example, a flow speed value and maximum inundation depth labeled data regarding tsunami caused by an earthquake. More specifically, the simulation data is a flow speed value and maximum inundation depth labeled data created by randomly setting a seismic center, a shift amount or a direction of a fault, or the like. Alternatively, the simulation data is, for example, a flow speed value and maximum inundation depth labeled data regarding tsunami caused by a landslide.

The data preprocessing unit 42 performs preprocessing of adding noise data on the flow speed value D10 acquired by the flow speed value acquiring unit 40. For example, the noise data is a flow speed value on the sea surface in normal times. Alternatively, for example, the data preprocessing unit 42 may add some other value to the flow speed value acquired by the flow speed value acquiring unit 40 in such a manner that the data becomes closer to data at the time of actual operation. For example, in a case where the data preprocessing unit 42 uses the flow speed value on the sea surface at normal times as noise data, the data preprocessing unit 42 performs data complementation for an observation point at which the flow speed value is missing due to missing of radar observation in consideration of characteristics of the radar that observes the flow speed value. In this case, for example, the data preprocessing unit 42 performs complementation using, as a flow speed value of a region in which the flow speed value is missing, a flow speed value of a region around the region in which the flow speed value is missing. Alternatively, for example, in a case where the data preprocessing unit 42 performs complementation using, as a flow speed value of a region in which the flow speed value is missing, a random number generated from average or variance of all observation values of the flow speed values. Alternatively, for example, the data preprocessing unit 42 performs complementation using, as a flow speed value of a region in which the flow speed value is missing, a specific value such as zero.

More specifically, in the first embodiment, the data preprocessing unit 42 further performs preprocessing of selecting learning data D12 used for generation of an inundation depth prediction model by the model generation unit 43 from the flow speed value D10 acquired by the flow speed value acquiring unit 40 and the maximum inundation depth labeled data D11 acquired by the maximum inundation depth labeled data acquiring unit 41. The data preprocessing unit 42 outputs the selected learning data D12 to the model generation unit 43.

The model generation unit 43 generates an inundation depth prediction model by learning inundation depth prediction for predicting an inundation depth on the ground from the flow speed value on the sea surface on the basis of the flow speed value acquired by the flow speed value acquiring unit 40 and the maximum inundation depth labeled data acquired by the maximum inundation depth labeled data acquiring unit 41.

The inundation depth prediction model generated by the model generation unit 43 is a machine learning model that predicts an inundation depth on the ground from the flow speed value on the sea surface. For example, the inundation depth prediction model generated by the model generation unit 43 is a machine learning model that predicts a probability distribution indicating an occurrence probability for each inundation depth from the flow speed value on the sea surface.

More specifically, in the first embodiment, the model generation unit 43 generates the inundation depth prediction model on the basis of the flow speed value preprocessed by the data preprocessing unit 42 and the maximum inundation depth labeled data acquired by the maximum inundation depth labeled data acquiring unit 41.

More specifically, the model generation unit 43 generates an inundation depth prediction model D13 on the basis of the learning data D12 (flow speed value and maximum inundation depth labeled data) selected by the data preprocessing unit 42. The model generation unit 43 outputs the generated inundation depth prediction model D13, and the flow speed value and the maximum inundation depth labeled data which are the learning data D12 used for learning to the evaluation unit 44.

The evaluation unit 44 evaluates the learning result of the inundation depth prediction on the basis of the inundation depth prediction model D13 generated by the model generation unit 43. More specifically, in the first embodiment, the evaluation unit 44 evaluates the learning result of the inundation depth prediction on the basis of the inundation depth prediction model D13 generated by the model generation unit 43, and the flow speed value and the maximum inundation depth labeled data used for learning by the model generation unit 43.

More specifically, in the first embodiment, the evaluation unit 44 evaluates the learning result of the inundation depth prediction on the basis of the inundation depth prediction model D13 generated by the model generation unit 43 and the learning data D12 (flow speed value and maximum inundation depth labeled data) used for learning by the model generation unit 43. The evaluation unit 44 outputs evaluation result D14 to the data preprocessing unit 42.

For example, the evaluation unit 44 predicts the inundation depth on the ground by inputting the flow speed value used for learning by the model generation unit 43 to the inundation depth prediction model generated by the model generation unit 43, and evaluates the learning result of the inundation depth prediction by calculating a ratio at which the predicted inundation depth falls within a prediction range. Alternatively, the evaluation unit 44 evaluates the learning result of the inundation depth prediction by calculating a regression error, a determination coefficient, or the like on the basis of the inundation depth prediction model generated by the model generation unit 43.

The above-described data preprocessing unit 42 further selects learning data on the basis of the evaluation performed by the evaluation unit 44. For example, in a case where the evaluation unit 44 evaluates the learning result of the inundation depth prediction by calculating a regression error as described above, the data preprocessing unit 42 sets a parameter value regarding selection of data to be performed at the time of learning in such a manner that the regression error is minimized, and performs selection of learning data again using the set parameter value. Then, the data preprocessing unit 42 outputs the further selected learning data to the model generation unit 43.

The above-described model generation unit 43 generates the inundation depth prediction model on the basis of the learning data (flow speed value and maximum inundation depth labeled data) further selected by the data preprocessing unit 42. In a case where the learning is completed, the model generation unit 43 stores a learned inundation depth prediction model D15 that has been generated in the storage unit 5.

In addition, in a case where the learning is completed, the model generation unit 43 predicts the inundation depth on the ground by inputting the flow speed value which is learning data to the generated inundation depth prediction model, and outputs a predicted inundation depth D16 and the maximum inundation depth labeled data which is the learning data D12 used for the learning to the display unit 6. A user can check a learning situation by the display unit 6 displaying the acquired inundation depth and maximum inundation depth labeled data.

In addition, in a case where the learning is completed, the model generation unit 43 outputs the generated inundation depth prediction model to the above-described inundation depth prediction device 100 as the learned inundation depth prediction model. The inundation depth predicting unit 12 of the processing unit 1 in the inundation depth prediction device 100 predicts the inundation depth on the ground by inputting the flow speed value to the learned inundation depth prediction model as described above. In addition, the storage unit 2 of the inundation depth prediction device 100 stores the learned inundation depth prediction model.

Figure 6:
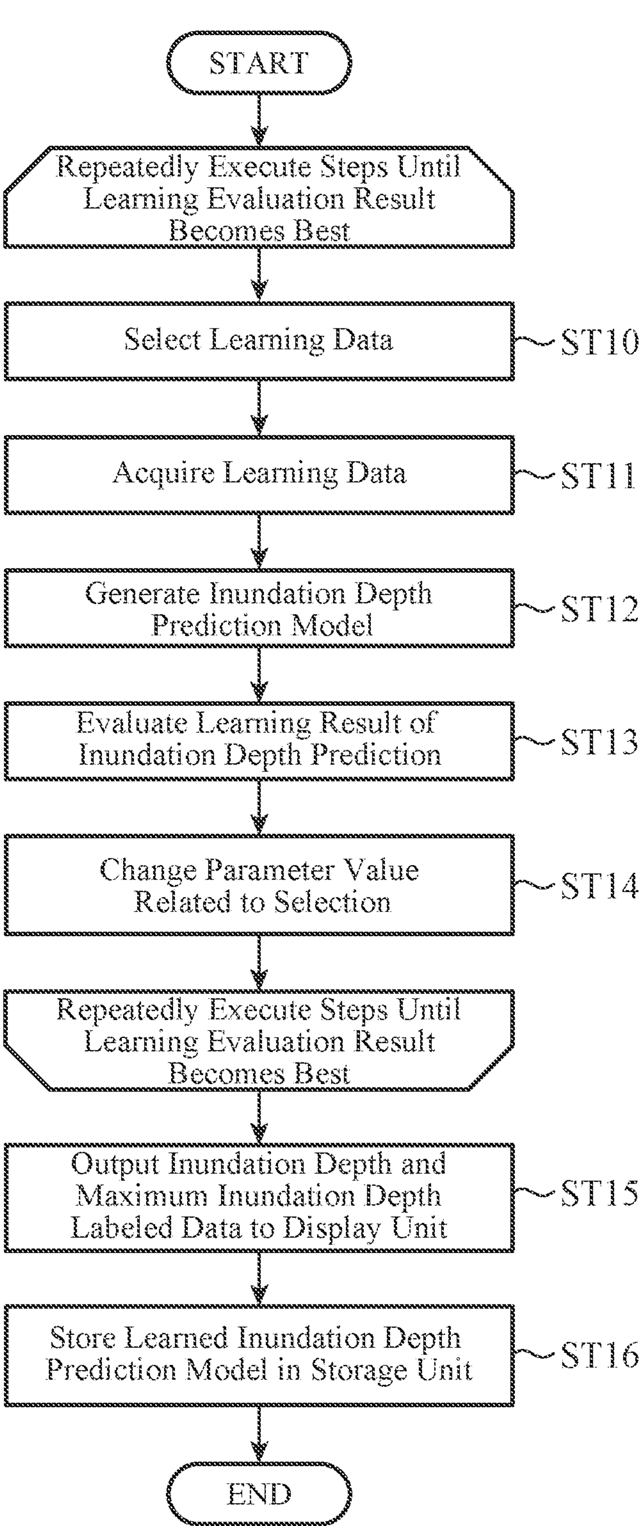
FIG. 6 is a flowchart illustrating an inundation depth learning method performed by the inundation depth prediction device according to the first embodiment.

Hereinafter, an operation of the inundation depth prediction learning device 102 according to the first embodiment will be described with reference to the drawings. FIG. 6 is a flowchart illustrating an inundation depth learning method performed by the inundation depth prediction device 100 according to the first embodiment. Note that it is assumed that before steps described below, the flow speed value acquiring unit 40 acquires a flow speed value on the sea surface, and the maximum inundation depth labeled data acquiring unit 41 acquires maximum inundation depth labeled data indicating a maximum inundation depth on the ground.

As illustrated in FIG. 6, the data preprocessing unit 42 performs preprocessing of selecting learning data used for generation of an inundation depth prediction model by the model generation unit 43 from the flow speed value acquired by the flow speed value acquiring unit 40 and the maximum inundation depth labeled data acquired by the maximum inundation depth labeled data acquiring unit 41 (step ST10). The data preprocessing unit 42 outputs the selected learning data to the model generation unit 43.

Next, the model generation unit 43 acquires the flow speed value and the maximum inundation depth labeled data which are the learning data selected by the data preprocessing unit 42 (step ST11).

Next, the model generation unit 43 generates an inundation depth prediction model by learning inundation depth prediction for predicting an inundation depth on the ground from the flow speed value on the sea surface on the basis of the flow speed value and the maximum inundation depth labeled data which are the learning data selected by the data preprocessing unit 42 (step ST12). The model generation unit 43 outputs the generated inundation depth prediction model, and the flow speed value and the maximum inundation depth labeled data used for learning to the evaluation unit 44.

Next, the evaluation unit 44 evaluates the learning result of the inundation depth prediction on the basis of the inundation depth prediction model generated by the model generation unit 43, and the flow speed value and the maximum inundation depth labeled data which are the learning data used for learning by the model generation unit 43 (step ST13). The evaluation unit 44 outputs the evaluation result to the data preprocessing unit 42.

Next, the data preprocessing unit 42 changes a parameter value regarding selection of data to be performed at the time of learning on the basis of the evaluation performed by the evaluation unit 44 (step ST14).

The inundation depth prediction learning device 102 repeatedly executes the processing in steps ST10 to ST14 described above for the number of parameter searches. As a result, the inundation depth prediction model is updated until the evaluation of the learning result of the inundation depth prediction becomes the best.

In a case where the learning is completed, the model generation unit 43 predicts the inundation depth on the ground by inputting the flow speed value which is learning data to the generated inundation depth prediction model, and outputs the predicted inundation depth and the maximum inundation depth labeled data used for the learning to the display unit 6 (step ST15). Then, a user can check a learning situation by the display unit 6 displaying the inundation depth and maximum inundation depth labeled data.

Next, the model generation unit 43 stores the generated inundation depth prediction model in the storage unit 5 as the learned inundation depth prediction model (step ST16).

Each function of the flow speed value acquiring unit 10, the data preprocessing unit 11, and the inundation depth predicting unit 12 in the processing unit 1 of the inundation depth prediction device 100, and each function of the flow speed value acquiring unit 40, the maximum inundation depth labeled data acquiring unit 41, the data preprocessing unit 42, the model generation unit 43, and the evaluation unit 44 in the learning unit 4 of the inundation depth prediction learning device 102 are implemented by a processing circuit. That is, the processing unit 1 of the inundation depth prediction device 100 and the learning unit 4 of the inundation depth prediction learning device 102 each include a processing circuit for executing the processing in the steps illustrated in FIGS. 4 and 6. This processing circuit may be dedicated hardware or a central processing unit (CPU) for executing a program stored in a memory.

Figure 7A:
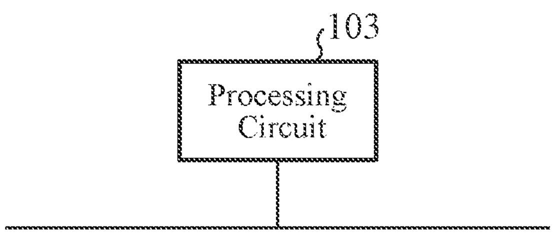
FIG. 7A is a block diagram illustrating a configuration of hardware that implements a function of the processing unit of the inundation depth prediction device according to the first embodiment and a function of the inundation depth prediction learning device according to the first embodiment.
Figure 7B:
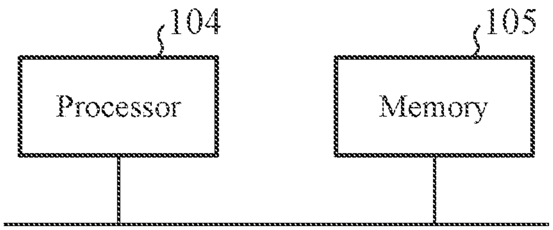
FIG. 7B is a block diagram illustrating a configuration of hardware that executes software that implements a function of the processing unit of the inundation depth prediction device according to the first embodiment and a function of the inundation depth prediction learning device according to the first embodiment.

FIG. 7A is a block diagram illustrating a configuration of hardware that implements a function of the processing unit 1 of the inundation depth prediction device 100 and a function of the learning unit 4 of the inundation depth prediction learning device 102. FIG. 7B is a block diagram illustrating a configuration of hardware that executes software that implements a function of the processing unit 1 of the inundation depth prediction device 100 and a function of the learning unit 4 of the inundation depth prediction learning device 102.

In a case where the processing circuit is a processing circuit 103 of dedicated hardware illustrated in FIG. 7A, for example, a single circuit, a composite circuit, a programmed processor, a parallel programmed processor, an application specific integrated circuit (ASIC), a field-programmable gate array (FPGA), or a combination thereof corresponds to the processing circuit 103.

Each function of the flow speed value acquiring unit 10, the data preprocessing unit 11, and the inundation depth predicting unit 12 in the processing unit 1 of the inundation depth prediction device 100, and each function of the flow speed value acquiring unit 40, the maximum inundation depth labeled data acquiring unit 41, the data preprocessing unit 42, the model generation unit 43, and the evaluation unit 44 in the learning unit 4 of the inundation depth prediction learning device 102 may be implemented by separate processing circuits, or these functions may be collectively implemented by one processing circuit.

In a case where the processing circuit is a processor 104 illustrated in FIG. 7B, each function of the flow speed value acquiring unit 10, the data preprocessing unit 11, and the inundation depth predicting unit 12 in the processing unit 1 of the inundation depth prediction device 100, and each function of the flow speed value acquiring unit 40, the maximum inundation depth labeled data acquiring unit 41, the data preprocessing unit 42, the model generation unit 43, and the evaluation unit 44 in the learning unit 4 of the inundation depth prediction learning device 102 are implemented by software, firmware, or a combination of software and firmware.

Note that software or firmware is described as a program and stored in a memory 105.

The processor 104 implements each function of the flow speed value acquiring unit 10, the data preprocessing unit 11, and the inundation depth predicting unit 12 in the processing unit 1 of the inundation depth prediction device 100, and each function of the flow speed value acquiring unit 40, the maximum inundation depth labeled data acquiring unit 41, the data preprocessing unit 42, the model generation unit 43, and the evaluation unit 44 in the learning unit 4 of the inundation depth prediction learning device 102 by reading and executing the program stored in the memory 105. That is, the processing unit 1 of the inundation depth prediction device 100 and the learning unit 4 of the inundation depth prediction learning device 102 each include the memory 105 for storing programs that cause the processing in the steps illustrated in FIGS. 4 and 6 to be executed as a result when these functions are executed by the processor 104.

These programs cause a computer to execute each procedure or each method of the flow speed value acquiring unit 10, the data preprocessing unit 11, and the inundation depth predicting unit 12 in the processing unit 1 of the inundation depth prediction device 100, and each procedure or each method of the flow speed value acquiring unit 40, the maximum inundation depth labeled data acquiring unit 41, the data preprocessing unit 42, the model generation unit 43, and the evaluation unit 44 in the learning unit 4 of the inundation depth prediction learning device 102. The memory 105 may be a computer-readable storage medium storing a program for causing a computer to function as each function of the flow speed value acquiring unit 10, the data preprocessing unit 11, and the inundation depth predicting unit 12 in the processing unit 1 of the inundation depth prediction device 100, and as each function of the flow speed value acquiring unit 40, the maximum inundation depth labeled data acquiring unit 41, the data preprocessing unit 42, the model generation unit 43, and the evaluation unit 44 in the learning unit 4 of the inundation depth prediction learning device 102.

For example, a central processing unit (CPU), a processing device, an arithmetic device, a processor, a microprocessor, a microcomputer, or a digital signal processor (DSP) corresponds to the processor 104.

For example, a nonvolatile or volatile semiconductor memory such as random access memory (RAM), read only memory (ROM), flash memory, erasable programmable read only memory (EPROM), or electrically-EPROM (EEPROM), a magnetic disk such as a hard disk or a flexible disk, an optical disc, a a mini disc, a compact disc (CD), or a digital versatile disc (DVD) corresponds to the memory 105.

Some of each function of the flow speed value acquiring unit 10, the data preprocessing unit 11, and the inundation depth predicting unit 12 in the processing unit 1 of the inundation depth prediction device 100, and some of each function of the flow speed value acquiring unit 40, the maximum inundation depth labeled data acquiring unit 41, the data preprocessing unit 42, the model generation unit 43, and the evaluation unit 44 in the learning unit 4 of the inundation depth prediction learning device 102 may be implemented by dedicated hardware. Some of each function of the flow speed value acquiring unit 10, the data preprocessing unit 11, and the inundation depth predicting unit 12, and some of each function of the flow speed value acquiring unit 40, the maximum inundation depth labeled data acquiring unit 41, the data preprocessing unit 42, the model generation unit 43, and the evaluation unit 44 may be implemented by software or firmware.

For example, the functions of the flow speed value acquiring unit 10, the data preprocessing unit 11, and the inundation depth predicting unit 12 are implemented by a processing circuit as dedicated hardware. The functions of the flow speed value acquiring unit 40, the maximum inundation depth labeled data acquiring unit 41, the data preprocessing unit 42, the model generation unit 43, and the evaluation unit 44 may be implemented by the processor 104 reading and executing a program stored in the memory 105.

As described above, the processing circuit can implement each of the above functions by hardware, software, firmware, or a combination thereof.

As described above, the inundation depth prediction device 100 according to the first embodiment includes: the flow speed value acquiring unit 10 that acquires a flow speed value on the sea surface; and the inundation depth predicting unit 12 that predicts an inundation depth on the ground by inputting the flow speed value acquired by the flow speed value acquiring unit 10 to a learned inundation depth prediction model used for predicting the inundation depth on the ground from the flow speed value on the sea surface.

According to the above configuration, the inundation depth can be directly predicted by input of the flow speed value to the learned inundation depth prediction model. Therefore, since a prediction error can be reduced, accuracy of tsunami prediction based on the flow speed value on the sea surface can be improved.

In the conventional technique described above, a wave height is estimated from the observed flow speed value on the sea surface, and tsunami prediction is performed using a case having the highest correlation in a database prepared in advance. This is because simulation of tsunami can be calculated by a finite element method by simulating the topography or the structure of the seabed, but it takes several hours even for a large-scale computer, and it is difficult to predict a damage of tsunami in real time on the basis of an observation result.

However, according to the above configuration of the inundation depth prediction device 100 according to the first embodiment, it is possible to predict the inundation depth due to tsunami in real time from the flow speed value on the sea surface observed by the radar. As a result, it is possible to quickly provide information effective for disaster prevention and disaster mitigation.

The inundation depth prediction device 100 according to the first embodiment further includes the data preprocessing unit 11 that performs preprocessing which is at least one of standardization and complementation of missing data on the flow speed value acquired by the flow speed value acquiring unit 10, and the inundation depth predicting unit 12 predicts the inundation depth by inputting the flow speed value preprocessed by the data preprocessing unit 11 to the learned inundation depth prediction model.

According to the above configuration, the inundation depth can be accurately predicted by input of the preprocessed flow speed value to the learned inundation depth prediction model. Therefore, accuracy of tsunami prediction based on the flow speed value on the sea surface can be improved.

The inundation depth predicting unit 12 in the inundation depth prediction device 100 according to the first embodiment predicts a primary prediction value of the inundation depth by inputting the flow speed value acquired by the flow speed value acquiring unit 10 to the learned inundation depth prediction model, and calculates a secondary prediction value of the inundation depth on the basis of the predicted primary prediction value and a past prediction value of the inundation depth predicted in the past.

According to the above configuration, the inundation depth can be accurately predicted by calculation of the secondary prediction value on the basis of the predicted primary prediction value and the past prediction value.

Therefore, accuracy of tsunami prediction based on the flow speed value on the sea surface can be improved.

The flow speed value acquired by the flow speed value acquiring unit 10 in the inundation depth prediction device 100 according to the first embodiment is time-series data indicating a flow speed value for each time, and the learned inundation depth prediction model used by the inundation depth predicting unit 12 is a convolutional neural network model.

According to the above configuration, the inundation depth can be directly predicted by input of the time-series data indicating the flow speed value for each time to the learned inundation depth prediction model of the convolutional neural network model. Therefore, since a prediction error can be reduced, accuracy of tsunami prediction based on the flow speed value on the sea surface can be improved.

The inundation depth predicting unit 12 in the inundation depth prediction device 100 according to the first embodiment determines whether or not the time-series data acquired by the flow speed value acquiring unit 10 includes a required amount of data for predicting the inundation depth using the learned inundation depth prediction model. In a case where the inundation depth predicting unit 12 determines that the time-series data does not include the required amount of data, the inundation depth predicting unit 12 performs complementation of a shortage amount of data on the time-series data acquired by the flow speed value acquiring unit 10.

According to the above configuration, in a case where the time-series data does not include the required amount of data, the time-series data is complemented with the shortage amount of data. As a result, since a prediction error can be reduced, accuracy of tsunami prediction based on the flow speed value on the sea surface can be improved.

The inundation depth predicting unit 12 in the inundation depth prediction device 100 according to the first embodiment predicts a probability distribution indicating an occurrence probability for each inundation depth by inputting the flow speed value acquired by the flow speed value acquiring unit 10 to the learned inundation depth prediction model.

According to the above configuration, it is possible to predict a plurality of cases and cope with tsunami even in a situation where prediction is difficult by performing prediction with a probability distribution instead of uniquely predicting the inundation depth by regression.

The inundation depth prediction learning device 102 according to the first embodiment includes: the flow speed value acquiring unit 40 that acquires the flow speed value on the sea surface; the maximum inundation depth labeled data acquiring unit 41 that acquires maximum inundation depth labeled data indicating a maximum inundation depth on the ground; and the model generation unit 43 that generates an inundation depth prediction model by learning inundation depth prediction for predicting an inundation depth on the ground from the flow speed value on the sea surface on the basis of the flow speed value acquired by the flow speed value acquiring unit 40 and the maximum inundation depth labeled data acquired by the maximum inundation depth labeled data acquiring unit 41.

According to the above configuration, an inundation depth prediction model used for predicting an inundation depth on the ground from the flow speed value on the sea surface is generated. As a result, the inundation depth can be directly predicted by input of the flow speed value to the generated inundation depth prediction model. Therefore, since a prediction error can be reduced, accuracy of tsunami prediction based on the flow speed value on the sea surface can be improved.

The inundation depth prediction learning device 102 according to the first embodiment further includes the evaluation unit 44 that evaluates a learning result of inundation depth prediction on the basis of the inundation depth prediction model generated by the model generation unit 43.

According to the above configuration, the inundation depth prediction model used for predicting the inundation depth on the ground from the flow speed value on the sea surface is evaluated. As a result, accuracy of tsunami prediction based on the flow speed value on the sea surface can be improved by update of the inundation depth prediction model on the basis of evaluation of a learning result of inundation depth prediction.

The inundation depth prediction learning device 102 according to the first embodiment further includes the data preprocessing unit 42 that performs preprocessing of adding noise data to the flow speed value acquired by the flow speed value acquiring unit 40, and the model generation unit 43 generates the inundation depth prediction model on the basis of the flow speed value preprocessed by the data preprocessing unit 42 and the maximum inundation depth labeled data acquired by the maximum inundation depth labeled data acquiring unit 41.

According to the above configuration, the inundation depth prediction model is generated on the basis of the flow speed value to which the noise data is added. As a result, accuracy of tsunami prediction based on the flow speed value on the sea surface can be improved by prediction of the inundation depth using the generated inundation depth prediction model.

The inundation depth prediction learning device 102 according to the first embodiment further includes the data preprocessing unit 42 that performs preprocessing of selecting learning data used for generation of the inundation depth prediction model by the model generation unit 43 from among the flow speed value acquired by the flow speed value acquiring unit 40 and the maximum inundation depth labeled data acquired by the maximum inundation depth labeled data acquiring unit 41, and the model generation unit 43 generates the inundation depth prediction model on the basis of the learning data selected by the data preprocessing unit 42.

According to the above configuration, the inundation depth prediction model is generated on the basis of the selected learning data. As a result, accuracy of tsunami prediction based on the flow speed value on the sea surface can be improved by prediction of the inundation depth using the generated inundation depth prediction model.

The inundation depth prediction learning device 102 according to the first embodiment further includes the evaluation unit 44 that evaluates a learning result of inundation depth prediction on the basis of the inundation depth prediction model generated by the model generation unit 43, and the data preprocessing unit 42 further selects learning data on the basis of the evaluation performed by the evaluation unit 44.

According to the above configuration, the inundation depth prediction model is generated on the basis of the learning data selected on the basis of the evaluation of the learning result of the inundation depth prediction. As a result, accuracy of tsunami prediction based on the flow speed value on the sea surface can be improved by prediction of the inundation depth using the generated inundation depth prediction model.

Note that any component in the embodiment can be modified, or any component in the embodiment can be omitted.

INDUSTRIAL APPLICABILITY

The inundation depth prediction device and the inundation depth prediction learning device according to the present disclosure are suitable for use in, for example, all domains capable of monitoring a situation of the sea surface with a radar or the like. For example, the inundation depth prediction device according to the present disclosure can predict an inundation depth due to tsunami from observed data and issue an alarm as a function added to a radar capable of monitoring a situation of the sea surface several tens of kilometers away from the land, such as a tsunami monitoring marine radar.

REFERENCE SIGNS LIST

1: processing unit, 2: storage unit, 3: display unit, 4: learning unit, 5: storage unit, 6: display unit, 10: flow speed value acquiring unit, 11: data preprocessing unit, 12: inundation depth predicting unit, 13: primary prediction unit, 14: secondary prediction unit, 40: flow speed value acquiring unit, 41: maximum inundation depth labeled data acquiring unit, 42: data preprocessing unit, 43: model generation unit, 44: evaluation unit, 100: inundation depth prediction device, 101: radar, 102: inundation depth prediction learning device, 103: processing circuit, 104: processor, 105: memory, 1000: inundation depth prediction system

The invention claimed is:

1. An inundation depth prediction device comprising:

flow speed value acquiring circuitry to acquire a flow speed value on a sea surface; and inundation depth predicting circuitry to predict an inundation depth on a ground by inputting the flow speed value acquired by the flow speed value acquiring circuitry directly to a learned inundation depth prediction model used for predicting the inundation depth on the ground from the flow speed value on the sea surface, wherein the inundation depth predicting circuitry predicts a primary prediction value of the inundation depth by inputting the flow speed value acquired by the flow speed value acquiring circuitry directly to the learned inundation depth prediction model, and calculates a secondary prediction value of the inundation depth on a basis of the predicted primary prediction value and a past prediction value of the inundation depth predicted in a past.

2. The inundation depth prediction device according to claim 1, further comprising data preprocessing circuitry to perform preprocessing which is at least one of standardization and complementation of missing data on the flow speed value acquired by the flow speed value acquiring circuitry, wherein the inundation depth predicting circuitry predicts the inundation depth by inputting the flow speed value preprocessed by the data preprocessing circuitry to the learned inundation depth prediction model.

3. An inundation depth prediction device comprising:

flow speed value acquiring circuitry to acquire a flow speed value on a sea surface; and inundation depth predicting circuitry to predict an inundation depth on a ground by inputting the flow speed value acquired by the flow speed value acquiring circuitry to a learned inundation depth prediction model used for predicting the inundation depth on the ground from the flow speed value on the sea surface, wherein the flow speed value acquired by the flow speed value acquiring circuitry is time-series data indicating a flow speed value for each time, the learned inundation depth prediction model used by the inundation depth predicting circuitry is a convolutional neural network model, and the inundation depth predicting circuitry determines whether or not the time-series data acquired by the flow speed value acquiring circuitry includes a required amount of data for predicting the inundation depth using the learned inundation depth prediction model, and in a case where the inundation depth predicting circuitry determines that the time-series data does not include the required amount of data, the inundation depth predicting circuitry performs complementation of a shortage amount of data on the time-series data acquired by the flow speed value acquiring circuitry.

4. An inundation depth prediction device comprising:

flow speed value acquiring circuitry to acquire a flow speed value on a sea surface; and inundation depth predicting circuitry to predict an inundation depth on a ground by inputting the flow speed value acquired by the flow speed value acquiring circuitry directly to a learned inundation depth prediction model used for predicting the inundation depth on the ground from the flow speed value on the sea surface, wherein the inundation depth predicting circuitry predicts a probability distribution indicating an occurrence probability for each inundation depth by inputting the flow speed value acquired by the flow speed value acquiring circuitry directly to the learned inundation depth prediction model.

5. An inundation depth prediction method comprising:

acquiring a flow speed value on a sea surface; and predicting an inundation depth on a ground by inputting the acquired flow speed value directly to a learned inundation depth prediction model used for predicting the inundation depth on the ground from the flow speed value on the sea surface, wherein a primary prediction value of the inundation depth is predicted by inputting the flow speed value acquired directly to the learned inundation depth prediction model, and a secondary prediction value of the inundation depth is calculated on a basis of the predicted primary prediction value and a past prediction value of the inundation depth predicted in a past.

6. An inundation depth prediction method comprising:

acquiring a flow speed value on a sea surface; and predicting an inundation depth on a ground by inputting the acquired flow speed value to a learned inundation depth prediction model used for predicting the inundation depth on the ground from the flow speed value on the sea surface, wherein the flow speed value acquired is time-series data indicating a flow speed value for each time, the learned inundation depth prediction model used is a convolutional neural network model, and it is determined whether or not the time-series data acquired includes a required amount of data for predicting the inundation depth using the learned inundation depth prediction model, and in a case where it is determined that the time-series data does not include the required amount of data, complementation of a shortage amount of data is performed on the time-series data acquired.

7. An inundation depth prediction method comprising:

acquiring a flow speed value on a sea surface; and predicting an inundation depth on a ground by inputting the acquired flow speed value directly to a learned inundation depth prediction model used for predicting the inundation depth on the ground from the flow speed value on the sea surface, wherein a probability distribution indicating an occurrence probability for each inundation depth is predicted by inputting the flow speed value acquired directly to the learned inundation depth prediction model.

* * * * *